US012749979B2

(12) United States Patent
Wu

(10) Patent No.: US 12,749,979 B2
(45) Date of Patent: Sep. 29, 2026

(54) MULTI-PHASE BUCK CONVERTER AND CHIP

(71) Applicant: Shanghai Hanmai Electronic Technology Co., Ltd, Shanghai (CN)

(72) Inventor: Xiaohui Wu, Shanghai (CN)

(73) Assignee: Shanghai Hanmai Electronic Technology Co., Ltd, Shanghai (CN)

( * ) Notice: Subject to any disclaimer, the term of this patent is extended or adjusted under 35 U.S.C. 154(b) by 139 days.

(21) Appl. No.: 18/926,300

(22) Filed: Oct. 24, 2024

(65) Prior Publication Data

US 2025/0175083 A1 May 29, 2025

(30) Foreign Application Priority Data

Nov. 28, 2023 (CN) ......................... 202311607676.2

(51) Int. Cl.

| | |
|---|---|
| ***H02M 3/158*** | (2006.01) |
| ***H02M 1/00*** | (2006.01) |
| ***H02M 1/32*** | (2007.01) |
| ***H02M 3/157*** | (2006.01) |

(52) U.S. Cl.

CPC ....... *H02M 3/1584* (2013.01); *H02M 1/0025* (2021.05); *H02M 1/32* (2013.01); *H02M 3/157* (2013.01); *H02M 3/1586* (2021.05)

(58) Field of Classification Search

CPC .. H02M 3/1584; H02M 3/157; H02M 1/0025; H02M 1/32; H02M 3/1586

See application file for complete search history.

(56) References Cited

U.S. PATENT DOCUMENTS 6,424,129 B1 * 7/2002 Lethellier ........... H02M 3/1588 323/272
9,793,800 B1 * 10/2017 Yan ....................... H02M 3/157
10,498,237 B1 * 12/2019 Lin ....................... H02M 3/158
10,924,013 B1 * 2/2021 Laur ....................... H02M 1/15
11,848,613 B1 * 12/2023 Gaddam ............. H02M 3/1584
2005/0200340 A1 * 9/2005 Jochum ............... H02M 3/1584 323/280
2009/0051334 A1 * 2/2009 Huang .................... H02M 1/14 323/247
2009/0051335 A1 * 2/2009 Huang .................. H02M 3/157 323/268

(Continued)

*Primary Examiner* — Yusef A Ahmed
(74) *Attorney, Agent, or Firm* — IPRTOP LLC

(57) ABSTRACT

A multi-phase buck converter including M converter branches and a loop error amplifier and a chip are provided. Each converter branch includes a driving module and a power stage output circuit. The driving module includes a current information error amplifier, a synchronous ramp voltage generation circuit configured to generate a synchronous ramp signal based on the output voltage, a pulse width modulation comparator, and a driving control circuit. The current information error amplifier compares a detection voltage across an output inductor in a current converter branch with a detection voltage across an output inductor of in a previous converter branch, to generate a current information error signal. The pulse width modulation comparator superimposes the current information error signal to the output voltage error signal to generate a modulation voltage signal, and compares the modulation voltage signal with the synchronous ramp signal to generate a duty cycle modulation set signal.

14 Claims, 5 Drawing Sheets

(56) References Cited

U.S. PATENT DOCUMENTS

| | | | | |
|---|---|---|---|---|
| 2009/0153110 | A1* | 6/2009 | Huang | H02J 1/102 323/282 |
| 2009/0153114 | A1* | 6/2009 | Huang | H02M 3/1584 323/282 |
| 2009/0167080 | A1* | 7/2009 | Carpenter | H02M 3/1584 307/14 |
| 2010/0320983 | A1* | 12/2010 | Wu | H02M 3/156 323/283 |
| 2012/0176105 | A1* | 7/2012 | Chang | H02M 3/1584 323/237 |
| 2013/0038312 | A1* | 2/2013 | Wang | H02M 3/1584 323/288 |
| 2014/0176097 | A1* | 6/2014 | Huang | G05F 1/59 323/272 |
| 2014/0375288 | A1* | 12/2014 | Nora | H02J 1/102 323/272 |
| 2018/0337599 | A1* | 11/2018 | Chen | H02M 3/158 |
| 2021/0028686 | A1* | 1/2021 | Jiang | H02M 3/1584 |
| 2022/0337162 | A1* | 10/2022 | Shen | G06F 1/28 |
| 2022/0393464 | A1* | 12/2022 | Venugopal | H02M 3/285 |
| 2023/0091808 | A1* | 3/2023 | Philbrick | H02M 3/1584 323/272 |
| 2023/0110617 | A1* | 4/2023 | Yang | H02M 3/157 323/266 |
| 2025/0219542 | A1* | 7/2025 | Kuo | H02M 3/1584 |

* cited by examiner

MULTI-PHASE BUCK CONVERTER AND CHIP

FIELD OF THE INVENTION

The present disclosure belongs to the technical field of switching power supplies, and relates to a buck converter, in particular to a multi-phase buck converter and a chip.

BACKGROUND OF THE INVENTION

In today's fast-paced world of information electronics, the demand for electronic products in daily life is rapidly increasing. This has led to a greater emphasis on developing high-performance power management chips. With advancements in chip manufacturing processes, high-performance system-on-a-chips (SOCs) for mobile platforms and high-computing-power graphics processing unit (GPU) chips for servers now commonly use 7 nm and smaller process technologies. To ensure the safe and stable operation of these advanced digital chips while reducing power consumption, their power chips need to offer high output precision, low output voltage, and high output current, along with excellent transient response (including input voltage and output load transients).

In multi-phase switching power supplies with multiple inductors and a single output, each phase's power switch control is relatively independent. This independence can lead to significant differences in the actual duty cycle output of each phase due to comparator offsets in the control loop, transmission delays in control logic, drive delays, dead time deviations, and differences in external inductance and printed circuit board (PCB) layout. These variations can result in significant differences in the actual output load supplied by each phase, affecting the lifespan of each phase's switching power supply loop and external inductance components, thereby reducing the safety and reliability of the power system. Therefore, it is essential to balance the output current of each phase in multi-phase power systems.

Currently, achieving multi-phase current sharing in multi-phase switching power supplies typically involves sampling the current information of each phase and directly comparing it with the overall average current information to generate the current difference for each phase. This current difference is then used to control the conduction time of each phase to achieve multi-phase current sharing. This circuit design requires obtaining the overall average current information, which necessitates additional circuit design to achieve multi-phase current sharing, resulting in a relatively complex overall design.

SUMMARY OF THE INVENTION

In view of the above-mentioned shortcomings, the present disclosure provides a multi-phase buck converter and a chip.

A first aspect of the present disclosure provides a multi-phase buck converter. The multi-phase buck converter comprises M converter branches connected in parallel and a loop error amplifier. Each of the converter branches comprises a driving module and a power stage output circuit, and the power stage output circuit is electrically coupled between the driving module and a voltage output terminal. M is an integer greater than or equal to 2. The loop error amplifier is configured to compare an output voltage at the voltage output terminal with a reference voltage to generate an output voltage error signal. The driving module in one of the converter branches from the second to the Mth comprises a current information error amplifier, a synchronous ramp voltage generation circuit, a pulse width modulation comparator, and a driving control circuit. The current information error amplifier is configured to receive, as a first terminal input, a detection voltage across an output inductor of the power stage output circuit in a current converter branch, to receive, as a second terminal input, a detection voltage across an output inductor of the power stage output circuit in a previous converter branch, and to compare the first terminal input with the second terminal input to generate a current information error signal. The synchronous ramp voltage generation circuit is configured to generate a synchronous ramp signal based on the output voltage at the voltage output terminal. The pulse width modulation comparator is configured to superimpose the current information error signal to the output voltage error signal to generate a modulation voltage signal, and compare the modulation voltage signal with the synchronous ramp signal to generate a duty cycle modulation set signal. The driving control circuit is configured to generate a driving signal based on the duty cycle modulation set signal, such that the power stage output circuit in the current converter branch outputs the output voltage based on the driving signal.

In the disclosed multi-phase buck converter, the current information error signal from the current information error amplifier and the output voltage error signal from the loop error amplifier are combined by the pulse width modulation comparator to create the modulation voltage signal. The modulation voltage signal is then compared with the synchronous ramp signal generated by the synchronous ramp voltage generation circuit to produce the duty cycle modulation set signal. The driving control circuit uses the duty cycle modulation set signal to generate the driving signal, which causes the power stage output circuit in the current converter branch to output the output voltage. Additionally, the duty cycle modulation set signal can control the duty cycle of the current converter branch, achieving multi-phase current sharing control. The design of the multi-phase buck converter is straightforward and cost-effective.

In one embodiment of the first aspect of the present disclosure, the power stage output circuit in one of the converter branches comprises the output inductor and an RC circuit electrically coupled in parallel with the output inductor, and the RC circuit comprises a filter resistor and a filter capacitor which are electrically coupled in series. The filter resistor and the filter capacitor are configured to filter a voltage across the output inductor to obtain the detection voltage corresponding to a current flowing through the output inductor.

In one embodiment of the first aspect of the present disclosure, the driving control circuit in one of the converter branches comprises an RS flip-flop and a switch driving circuit. The RS flip-flop is configured to generate a duty cycle signal based on the duty cycle modulation set signal. The switch driving circuit is configured to generate the driving signal based on the duty cycle signal.

In one embodiment of the first aspect of the present disclosure, the driving module further comprises an adaptive constant-on-time generation circuit. The adaptive constant-on-time generation circuit is configured to generate a duty cycle reset signal based on the duty cycle signal and a reference switching frequency of the current converter branch. The RS flip-flop is configured to generate the duty cycle signal based on the duty cycle modulation set signal and the duty cycle reset signal.

In one embodiment of the first aspect of the present disclosure, the adaptive constant-on-time generation circuit is configured to generate a frequency error signal based on the duty cycle signal and the reference switching frequency, generate an adaptive on-capacitance voltage signal based on the duty cycle signal, and generate the duty cycle reset signal based on the frequency error signal and the adaptive on-capacitance voltage signal.

In one embodiment of the first aspect of the present disclosure, the synchronous ramp voltage generation circuit in one of the converter branches is configured to generate the synchronous ramp signal based on the output voltage and a voltage at a switch output terminal of the power stage output circuit in the current converter branch. The output inductor is electrically coupled between the switch output terminal and the voltage output terminal.

In one embodiment of the first aspect of the present disclosure, the driving module in the first one of the converter branches comprises a synchronous ramp voltage generation circuit, a pulse width modulation comparator, and a driving control circuit. The synchronous ramp voltage generation circuit is configured to generate a synchronous ramp signal based on the output voltage at the voltage output terminal. The pulse width modulation comparator is configured to compare the output voltage error signal with the synchronous ramp signal to generate a duty cycle modulation set signal. The driving control circuit is configured to generate a driving signal based on the duty cycle modulation set signal, such that the power stage output circuit in a current converter branch outputs the output voltage based on the driving signal.

In one embodiment of the first aspect of the present disclosure, the driving module in the first one of the converter branches comprises a current information error amplifier, a synchronous ramp voltage generation circuit, a pulse width modulation comparator, and a driving control circuit. The current information error amplifier is configured to receive, as a first terminal input, a detection voltage across an output inductor of the power stage output circuit in a current converter branch, to receive, as a second terminal input, a detection voltage across an output inductor of the power stage output circuit in an Mth converter branch, and to compare the first terminal input with the second terminal input to generate a current information error signal. The synchronous ramp voltage generation circuit is configured to generate a synchronous ramp signal based on the output voltage at the voltage output terminal. The pulse width modulation comparator is configured to superimpose the current information error signal to the output voltage error signal to generate a modulation voltage signal, and compare the modulation voltage signal with the synchronous ramp signal to generate a duty cycle modulation set signal. The driving control circuit is configured to generate a driving signal based on the duty cycle modulation set signal, such that the power stage output circuit in the current converter branch outputs the output voltage based on the driving signal.

In one embodiment of the first aspect of the present disclosure, the power stage output circuit in one of the converter branches comprises a high-side switch, a low-side switch, an output inductor, a filter resistor, and a filter capacitor. A source of the high-side switch is electrically coupled to a power supply terminal, a drain of the high-side switch is electrically coupled to a switch output terminal, and a gate of the high-side switch receives the driving signal. A source of the low-side switch is grounded, a drain of the low-side switch is electrically coupled to the switch output terminal, and a gate of the low-side switch receives the driving signal. A first terminal of the output inductor is electrically coupled to the switch output terminal, and a second terminal of the output inductor is electrically coupled to the voltage output terminal. A first terminal of the filter resistor is electrically coupled to the first terminal of the output inductor, a first terminal of the filter capacitor is electrically coupled to a second terminal of the filter resistor, and a second terminal of the filter capacitor is electrically coupled to the second terminal of the output inductor.

In one embodiment of the first aspect of the present disclosure, the pulse width modulation comparator in one of the converter branches comprises a first PMOS transistor, a second PMOS transistor, a third PMOS transistor, a first comparator, a first resistor, and a second resistor. A gate of the first PMOS transistor is connected to an output terminal of a corresponding current information error amplifier. A gate of the second PMOS transistor is connected to an output terminal of the loop error amplifier, a source of the second PMOS transistor is connected to a source of the first PMOS transistor, and a drain of the second PMOS transistor is connected to a drain of the first PMOS transistor. A gate of the third PMOS transistor is connected to an output terminal of a corresponding synchronous ramp voltage generation circuit, and a source of the third PMOS transistor is connected to the source of the second PMOS transistor. An output terminal of the first comparator outputs the duty cycle modulation set signal. A first terminal of the first resistor is connected to the drain of the second PMOS transistor and an inverting input terminal of the first comparator, and a second terminal of the first resistor is grounded. A first terminal of the second resistor is connected to a drain of the third PMOS transistor and a non-inverting input terminal of the first comparator, and a second terminal of the second resistor is grounded.

In one embodiment of the first aspect of the present disclosure, the multi-phase buck converter further comprises a common-mode level generation circuit. The pulse width modulation comparator in one of the converter branches comprises a fourth PMOS transistor, a fifth PMOS transistor, a sixth PMOS transistor, a seventh PMOS transistor, a second comparator, a third resistor, and a fourth resistor. A gate of the fourth PMOS transistor is connected to an output terminal of the corresponding current information error amplifier. A gate of the fifth PMOS transistor is connected to an output terminal of the common-mode level generation circuit, a source of the fifth PMOS transistor is connected to a source of the fourth PMOS transistor, and a drain of the fifth PMOS transistor is connected to a drain of the fourth PMOS transistor. A gate of the sixth PMOS transistor is connected to an output terminal of the loop error amplifier. A gate of the seventh PMOS transistor is connected to an output terminal of the corresponding synchronous ramp voltage generation circuit, and a source of the seventh PMOS transistor is connected to a source of the sixth PMOS transistor. An output terminal of the second comparator outputs the duty cycle modulation set signal. A first terminal of the third resistor is connected to the drain of the fourth PMOS transistor and a drain of the sixth PMOS transistor, and a second terminal of the third resistor is grounded. A first terminal of the fourth resistor is connected to the drain of the fifth PMOS transistor and a drain of the seventh PMOS transistor, and a second terminal of the fourth resistor is grounded.

In one embodiment of the first aspect of the present disclosure, the current information error amplifier in one of the converter branches comprises a current information detection amplifier, a first capacitor, a fifth resistor, and a second capacitor. A non-inverting input terminal of the current information detection amplifier inputs the detection voltage across the output inductor in the previous converter branch, and an inverting input terminal of the current information detection amplifier inputs the detection voltage across the output inductor in the current converter branch. A first terminal of the first capacitor is connected to an output terminal of the current information detection amplifier, and a second terminal of the first capacitor is grounded. A first terminal of the fifth resistor is connected to the first terminal of the first capacitor and the output terminal of the current information detection amplifier. A first terminal of the second capacitor is connected to a second terminal of the fifth resistor, and a second terminal of the second capacitor is grounded.

In one embodiment of the first aspect of the present disclosure, switching frequencies of the converter branches are the same, and a phase shift of a $P_{th}$ converter branch is $$\frac{(P-1)\times 360}{M},$$

where 1≤p≤m and p is a positive integer.

In one embodiment of the first aspect of the present disclosure, the output inductors in the converter branches are configured to have same parameters and same parasitic resistances.

A second aspect of the present disclosure provides a chip. The chip comprises a die, on which a multi-phase buck converter as described in the first aspect of the present disclosure is disposed. An input terminal of one of the power stage output circuits is electrically coupled to an output terminal of a corresponding driving module through a first trace on the die, an output terminal of the power stage output circuit is electrically coupled to the voltage output terminal through a second trace on the die, and the voltage output terminal is configured to be electrically coupled to a load.

In one embodiment of the second aspect of the present disclosure, the driving module in the first one of the converter branches comprises: a synchronous ramp voltage generation circuit, configured to generate a synchronous ramp signal based on the output voltage at the voltage output terminal; a pulse width modulation comparator, configured to compare the output voltage error signal with the synchronous ramp signal to generate a duty cycle modulation set signal; and a driving control circuit, configured to generate a driving signal based on the duty cycle modulation set signal, such that the power stage output circuit in a current converter branch outputs the output voltage based on the driving signal.

In one embodiment of the second aspect of the present disclosure, the driving module in the first one of the converter branches comprises: a current information error amplifier, configured to receive, as a first terminal input, a detection voltage across an output inductor of the power stage output circuit in a current converter branch, to receive, as a second terminal input, a detection voltage across an output inductor of the power stage output circuit in an Mth converter branch, and to compare the first terminal input with the second terminal input to generate a current information error signal; a synchronous ramp voltage generation circuit, configured to generate a synchronous ramp signal based on the output voltage at the voltage output terminal; a pulse width modulation comparator, configured to superimpose the current information error signal to the output voltage error signal to generate a modulation voltage signal, and compare the modulation voltage signal with the synchronous ramp signal to generate a duty cycle modulation set signal; and a driving control circuit, configured to generate a driving signal based on the duty cycle modulation set signal, such that the power stage output circuit in the current converter branch outputs the output voltage based on the driving signal.

In one embodiment of the second aspect of the present disclosure, the power stage output circuit comprises the output inductor and an RC circuit electrically coupled in parallel with the output inductor, and the RC circuit comprises a filter resistor and a filter capacitor which are electrically coupled in series. The filter resistor and the filter capacitor are configured to filter a voltage across the output inductor to obtain the detection voltage corresponding to a current flowing through the output inductor.

In one embodiment of the second aspect of the present disclosure, the driving control circuit comprises: an RS flip-flop, configured to generate a duty cycle signal based on the duty cycle modulation set signal; a switch driving circuit, configured to generate the driving signal based on the duty cycle signal; and an adaptive constant-on-time generation circuit, configured to generate a duty cycle reset signal based on the duty cycle signal and a reference switching frequency of the current converter branch. The RS flip-flop is configured to generate the duty cycle signal based on the duty cycle modulation set signal and the duty cycle reset signal.

In one embodiment of the second aspect of the present disclosure, the synchronous ramp voltage generation circuit is configured to: generate the synchronous ramp signal based on the output voltage and a voltage at a switch output terminal of the power stage output circuit in the current converter branch. The output inductor is electrically coupled between the switch output terminal and the voltage output terminal.

In the disclosed multi-phase buck converter, the current information error signal from the current information error amplifier and the output voltage error signal from the loop error amplifier are combined by the pulse width modulation comparator to create the modulation voltage signal. The modulation voltage signal is then compared with the synchronous ramp signal generated by the synchronous ramp voltage generation circuit to produce the duty cycle modulation set signal. The driving control circuit uses the duty cycle modulation set signal to generate the driving signal, which causes the power stage output circuit in the current converter branch to output the output voltage. Additionally, the duty cycle modulation set signal can control the duty cycle of the current converter branch, achieving multi-phase current sharing control. The design of the multi-phase buck converter is straightforward and cost-effective.

DETAILED DESCRIPTION OF THE INVENTION

Figure 1:
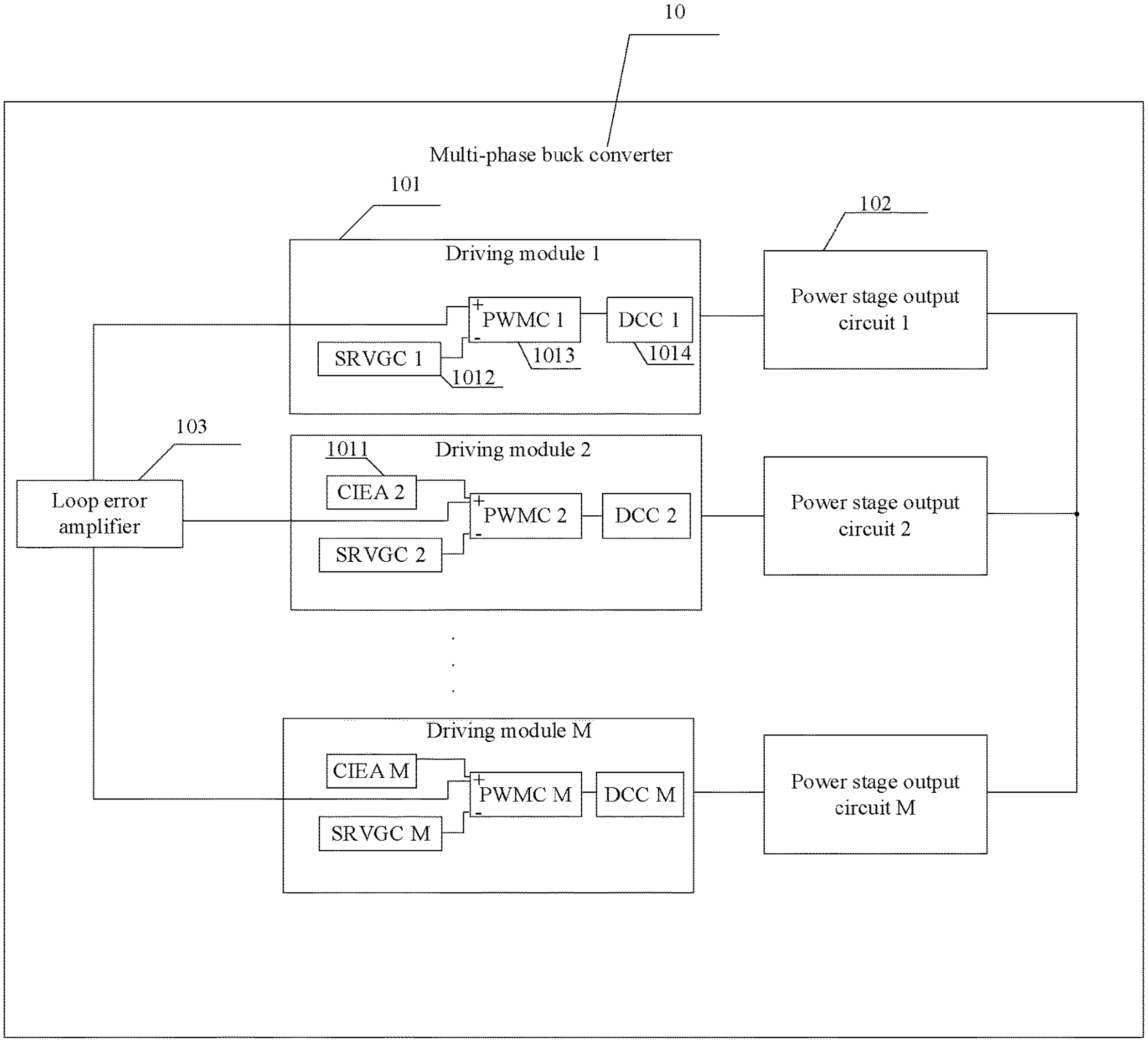
FIG. 1 is a schematic structural diagram of a multi-phase buck converter according to an embodiment of the present disclosure.

The embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and applications without departing from the spirit of the present disclosure. It should be noted that the following embodiments and the features of the following embodiments can be combined with each other if no conflict will result.

Refer to FIGS. 1-7. It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated.

The embodiments of the present disclosure provide a multi-phase buck converter and a chip, designed to simplify the overall circuit design by eliminating the need for obtaining overall average current information and additional current design, which are necessary in existing multi-phase buck converters for achieving multi-phase current sharing control.

In some embodiments, by sampling the voltage across each phase output inductor, the current information related to the inductor's direct current resistance (DCR) is obtained, allowing for current sharing control without the need for additional series detection resistors. Inductors from the same batch with equal parasitic resistance are used for each phase, and by sampling the voltage at the left end of the inductor alone, the DC current information of each phase's inductor can be obtained. A common loop error amplifier is used for all phases, which compares the output voltage with the reference voltage to generate the output voltage error signal. This output voltage error signal is then combined with a signal representing the current error between adjacent phases to generate a current modulation voltage for each phase, used for subsequent current sharing control.

In some embodiments, a specific signal addition method is designed to superimpose the signal representing the current error onto the output voltage error signal of the loop error amplifier, to generate a modulation voltage signal that contains both the loop output voltage error information and the output current error information between adjacent phases. The modulation voltage signal is compared with the synchronous ramp signal of each phase to generate SET logic, which is used to control the output current of each phase, thus achieving multi-phase current sharing control.

The principle and implementation of the multi-phase buck converter and the chip of the present disclosure will be described in detail below, so that the skilled person in the field can understand them without creative labor.

FIG. 1 is a schematic structural diagram of a multi-phase buck converter 10 according to an embodiment of the present disclosure. As shown in FIG. 1, the multi-phase buck converter 10 comprises converter branches connected in parallel and a loop error amplifier 103. The number of the converter branches is M, and M is an integer greater than or equal to 2.

Each of the converter branches comprises a driving module 101 and a power stage output circuit 102, and the power stage output circuit 102 is electrically coupled between the driving module 101 and a voltage output terminal.

The loop error amplifier 103 is configured to compare an output voltage at the voltage output terminal with a reference voltage to generate an output voltage error signal.

The driving module 101 in one of the converter branches from the second to the Mth comprises a current information error amplifier (or, CIEA) 1011, a synchronous ramp voltage generation circuit (or, SRVGC) 1012, a pulse width modulation comparator (or, PWMC) 1013, and a driving control circuit (or, DCC) 1014. In some embodiments, the driving module 101 in each of the converter branches from the second to the Mth comprises the current information error amplifier 1011, the synchronous ramp voltage generation circuit 1012, the pulse width modulation comparator 1013, and the driving control circuit 1014.

The current information error amplifier 1011 is configured to receive, as a first terminal input, a detection voltage across an output inductor of the power stage output circuit 102 in a current converter branch. The current information error amplifier 1011 is configured to receive, as a second terminal input, a detection voltage across an output inductor of the power stage output circuit 102 in a previous converter branch. In addition, the current information error amplifier 1011 is configured to compare the first terminal input with the second terminal input to generate a current information error signal.

The synchronous ramp voltage generation circuit 1012 is configured to generate a synchronous ramp signal based on the output voltage at the voltage output terminal.

The pulse width modulation comparator 1013 is configured to superimpose the current information error signal to the output voltage error signal to generate a modulation voltage signal, and compare the modulation voltage signal with the synchronous ramp signal to generate a duty cycle modulation set signal.

Figure 2:
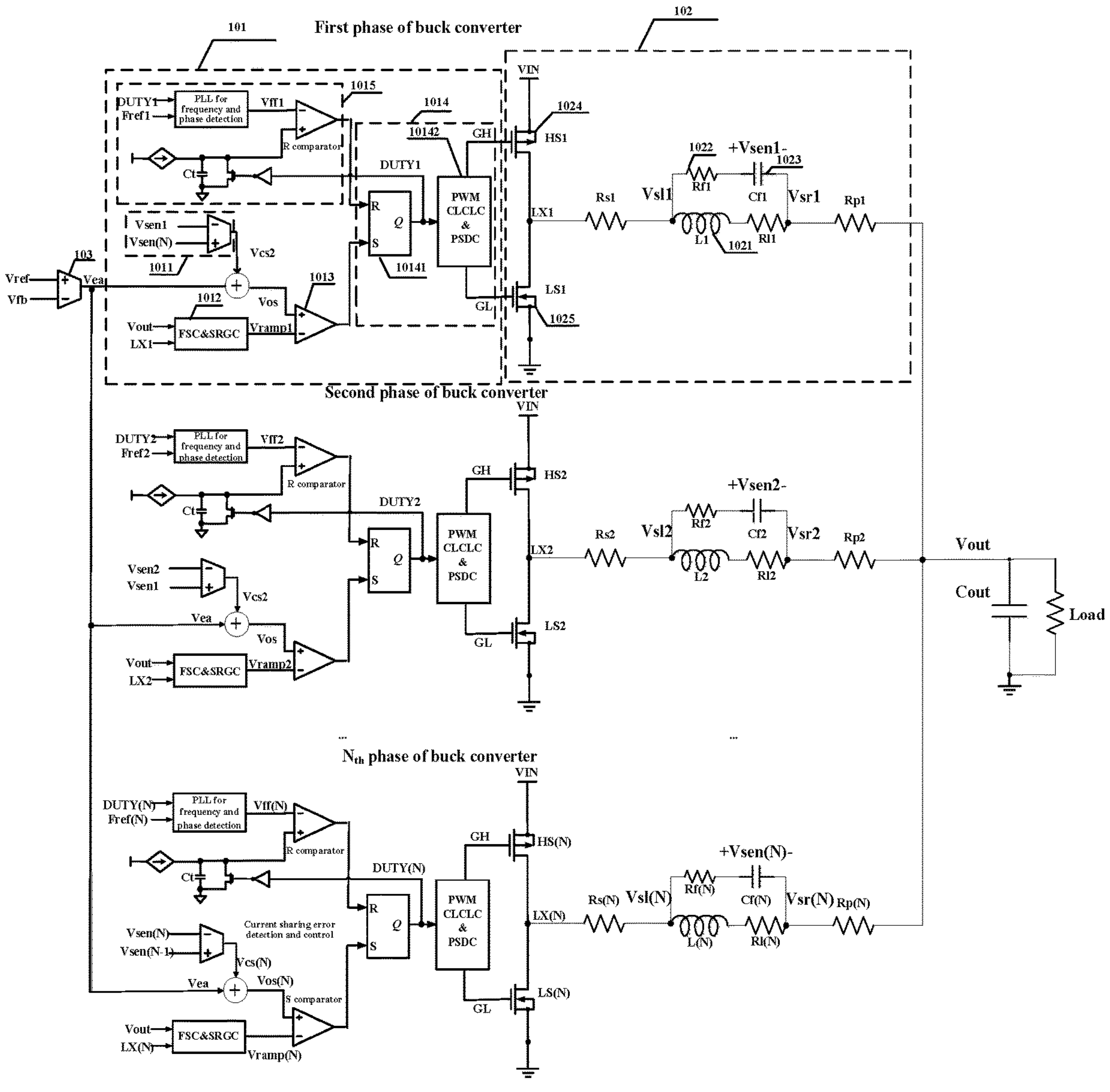
FIG. 2 is a schematic structural diagram of a multi-phase buck converter according to another embodiment of the present disclosure.

The driving control circuit 1014 is configured to generate a driving signal based on the duty cycle modulation set signal, such that the power stage output circuit 102 in the current converter branch outputs the output voltage based on the driving signal. FIG. 2 is a schematic structural diagram of a multi-phase buck converter according to another embodiment of the present disclosure. In some embodiments, as shown in FIG. 2, the power stage output circuit 102 in one or more of the converter branches comprises an output inductor 1021 and a resistor-capacitor (RC) circuit electrically coupled in parallel with the output inductor 1021, and the RC circuit comprises a filter resistor 1022 and a filter capacitor 1023 which are electrically coupled in series. The filter resistor 1022 and the filter capacitor 1023 are configured to filter a voltage across the output inductor 1021 to obtain the detection voltage corresponding to a current flowing through the output inductor 1021.

In some embodiments, the output inductors 1021 in the different converter branches are configured to have same parameters and parasitic resistances. In practical applications, when laying out the printed circuit board (PCB) for a multi-phase buck converter, it is possible to ensure that a parasitic impedance Rp from a right end voltage information Vsr of the output inductor 1021 to an output capacitor Cout is kept as consistent as possible. Additionally, inductors from the same batch with equal parasitic resistance R1 are used for each phase. Therefore, by sampling only a left end voltage information Vs1 of the output inductor 1021, the DC current information of the inductor current for each phase can be obtained. By using integrated filter resistors 1022 and filter capacitors 1023 to filter the voltage across the output inductor 1021, a relatively stable voltage signal is obtained. When the parasitic impedance Rp is set to be much smaller than parasitic resistance R1, the left end voltage of the filter capacitor 1023 can be represented as Vsen, which has a small ripple amplitude and contains the output current information for each phase. The current is utilized to detect the left end voltage Vsen, and the output current information between two adjacent phases, except for the first phase, can be compared to obtain the current information error signal Vcs between the two phases.

Figure 3:
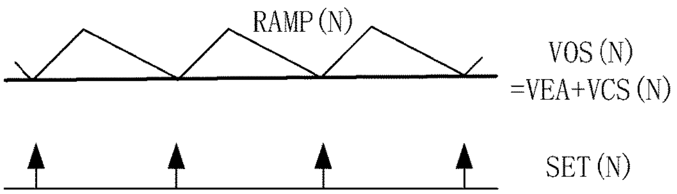
FIG. 3 is a schematic diagram illustrating a waveform of a duty cycle modulation set signal according to an embodiment of the present disclosure.

In the Nth converter branch, where 2≤N=M and N is a positive integer, the current information error signal Vcs(N) of the Nth converter branch is added to the output voltage error signal Vea through a specific signal addition method, to generate the modulation voltage signal Vos(N) for the Nth converter branch. The modulation voltage signal Vos(N) is then compared with the synchronous ramp signal RAMP(N) of the Nth converter branch to produce the duty cycle modulation set signal SET(N). When the duty cycle modulation set signal is a high logic signal (H), the driving control circuit 1014 generates the driving signal based on this high duty cycle modulation set signal. Conversely, when the duty cycle modulation set signal is a low logic signal (L), the driving control circuit 1014 generates the driving signal based on this low duty cycle modulation set signal. FIG. 3 is a schematic diagram illustrating a waveform of the duty cycle modulation set signal according to an embodiment of the present disclosure. It should be understood that Vramp shown in FIG. 2 and RAMP shown in FIG. 3 refer to the same signal.

In one embodiment, the driving control circuit 1014 in one of the converter branches comprises an RS flip-flop 10141 and a switch driving circuit 10142. The RS flip-flop 10141 is configured to generate a duty cycle signal based on the duty cycle modulation set signal. The switch driving circuit 10142 is configured to generate the driving signal based on the duty cycle signal. The switch driving circuit 10142 can be composed of a closed-loop control logic circuit (or, CLCLC) and a power switch driving circuit (or, PSDC), and the closed-loop control logic circuit and the power switch driving circuit are configured to control the closed-loop control of the current converter branch and the working state of the power switch, and generate the driving signal. When the duty cycle modulation set signal is a high logic signal H, the duty cycle signal DUTY is a high logic signal H, and when the duty cycle modulation set signal is a low logic signal L, the duty cycle signal DUTY is a low logic signal L. In some embodiments, the driving control circuit 1014 in each of the converter branches comprises the RS flip-flop 10141 and the switch driving circuit 10142.

In one embodiment, the driving module 101 further comprises an adaptive constant-on-time (ACOT) generation circuit 1015. The adaptive constant-on-time generation circuit 1015 is configured to generate a duty cycle reset signal based on the duty cycle signal and a reference switching frequency of the current converter branch. The RS flip-flop 10141 is configured to generate the duty cycle signal based on the duty cycle modulation set signal and the duty cycle reset signal. When the duty cycle modulation set signal and the duty cycle reset signal are both high logic signals H, the duty cycle signal DUTY is a low logic signal L.

In one embodiment, the adaptive constant-on-time generation circuit 1015 is configured to generate a frequency error signal Vff based on the duty cycle signal DUTY and the reference switching frequency Fref, generate an adaptive on-capacitance voltage signal based on the duty cycle signal DUTY, and generate the duty cycle reset signal based on the frequency error signal Vff and the adaptive on-capacitance voltage signal.

In one embodiment, the adaptive constant-on-time generation circuit 1015 may comprises a phase-locked loop (PLL) with a current source for frequency and phase detection, an on-time comparator (which compares the PLL error and timing voltage on a cycle-by-cycle basis) connected to the current source, a timing capacitor, and a timing switch with its base connected to a NOT gate. The current source generates sourcing and sinking currents, and the adaptive constant-on-time generation circuit 1015 produces an adaptive constant-on-time with frequency-locking information. The on-time comparator, also known as the R comparator, has its positive input connected to the adaptive on-capacitance voltage signal and its negative input connected to the frequency error signal Vff. The on-time comparator outputs the duty cycle reset signal. By incorporating the adaptive constant-on-time generation circuit 1015, the multi-phase buck converter retains the advantages of fast response and high conversion efficiency while being based on the ACOT architecture.

In one embodiment, the synchronous ramp voltage generation circuit 1012 in each of the converter branches is configured to generate the synchronous ramp signal based on the output voltage and a voltage at a switch output terminal of the power stage output circuit 102 in the current converter branch. The output inductor 1023 is electrically coupled between the switch output terminal and the voltage output terminal.

Figure 4:
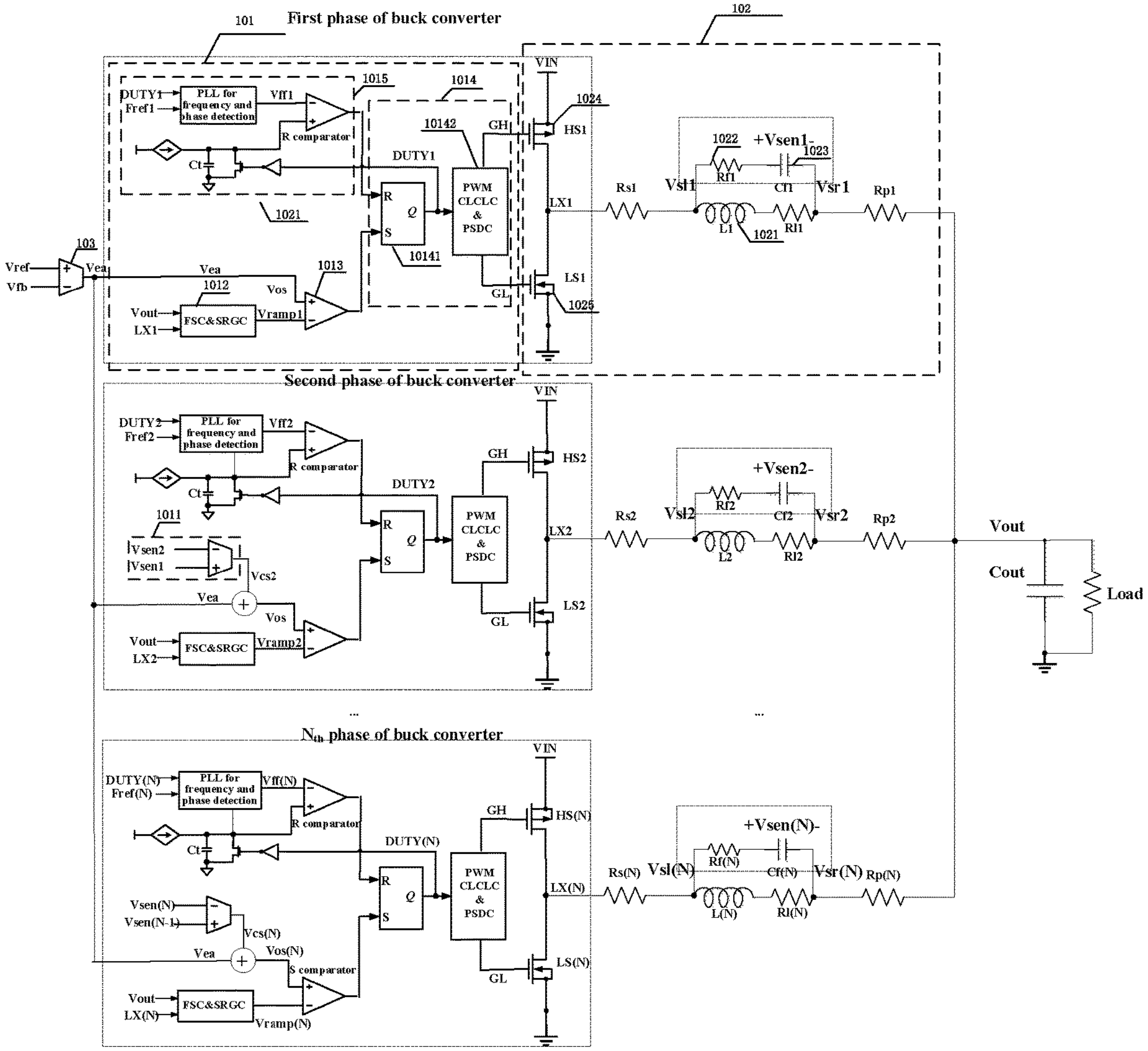
FIG. 4 is a schematic structural diagram of a multi-phase buck converter according to yet another embodiment of the present disclosure.

FIG. 4 is a schematic structural diagram of a multi-phase buck converter according to an embodiment of the present disclosure. In some embodiments, referring to FIG. 4, the driving module 101 in the first one of the M converter branches comprises a synchronous ramp voltage generation circuit 1012, a pulse width modulation comparator 1013, and a driving control circuit 1014. The synchronous ramp voltage generation circuit 1012 is configured to generate a synchronous ramp signal based on the output voltage at the voltage output terminal. The pulse width modulation comparator 1013 is configured to compare the output voltage error signal with the synchronous ramp signal to generate a duty cycle modulation set signal. The driving control circuit 1014 is configured to generate a driving signal based on the duty cycle modulation set signal, such that the power stage output circuit 102 in the current converter branch outputs the output voltage based on the driving signal.

In some other embodiments, referring to FIG. 2, the driving module 101 in the first one of the converter branches comprises a current information error amplifier 1011, a synchronous ramp voltage generation circuit 1012, a pulse width modulation comparator 1013, and a driving control circuit 1014. It should be noted that the components of the driving module 101 in the first one of the converter branches and those in the second one are separate components but structurally identical, unless otherwise indicated. The current information error amplifier 1011 is configured to receive, as a first terminal input, a detection voltage across an output inductor 1021 of the power stage output circuit 102 in a current converter branch. The current information error amplifier 1011 is configured to receive, as a second terminal input, a detection voltage across an output inductor 1021 of the power stage output circuit 102 in an Mth converter branch. In addition, the current information error amplifier 1011 is configured to compare the first terminal input with the second terminal input to generate a current information error signal. The synchronous ramp voltage generation circuit 1012 is configured to generate a synchronous ramp signal based on the output voltage at the voltage output terminal. The pulse width modulation comparator 1013 is configured to superimpose the current information error signal to the output voltage error signal to generate a modulation voltage signal, and compare the modulation voltage signal with the synchronous ramp signal to generate a duty cycle modulation set signal. The driving control circuit 1014 is configured to generate a driving signal based on the duty cycle modulation set signal, such that the power stage output circuit 102 in the current converter branch outputs the output voltage based on the driving signal.

The difference between the multi-phase buck converter shown in FIG. 2 and the one in FIG. 4 is that the driving module 101 in the first one of the converter branches of FIG. 2 comprises a current information error amplifier 1011, while the driving module 101 in the first one of the converter branches of FIG. 4 does not. In other words, the driving module 101 in the first one of the converter branches of FIG. 2 is configured the same as the driving modules 101 in the other converter branches. When the driving module 101 comprises the current information error amplifier 1011, the pulse width modulation comparator 1013 is configured to superimpose the current information error signal to the output voltage error signal to generate the modulation voltage signal, and compare the modulation voltage signal with the synchronous ramp signal to generate the duty cycle modulation set signal. Conversely, when the driving module 101 does not comprise the current information error amplifier 1011, the pulse width modulation comparator 1013 is configured to compare the output voltage error signal with the synchronous ramp signal to generate the duty cycle modulation set signal. Additionally, the current information error amplifier 1011 in the first one of the converter branches is configured to receive the detection voltages from the output inductors in both the current converter branch and any other converter branch, generating the current information error signal. In contrast, the current information error amplifiers in the other converter branches are configured to receive the detection voltages from the output inductors in the current converter branch and the previous converter branch to generate the current information error signal. The multi-phase buck converter shown in FIG. 4 has a relatively slower current sharing response in multi-phase current sharing control compared to that shown in FIG. 2. However, its loop stability design is simpler. Both the multi-phase buck converters in FIGS. 2 and 4 can maintain the advantages of the ACOT architecture, such as simple loop design and fast response, while ensuring stable current sharing control between phases.

In one embodiment, the power stage output circuit 102 in each of the converter branches comprises a high-side switch (HS) 1024, a low-side switch (LS) 1025, an output inductor 1021, a filter resistor 1022, and a filter capacitor 1023. A source of the high-side switch 1024 is electrically coupled to a power supply terminal, a drain of the high-side switch 1024 is electrically coupled to a switch output terminal, and a gate of the high-side switch 1024 receives the driving signal. It should be noted that the high-side switch 1024 can be either a PMOS or NMOS power transistor. A source of the low-side switch 1025 is grounded, a drain of the low-side switch 1025 is electrically coupled to the switch output terminal, and a gate of the low-side switch 1025 receives the driving signal. It should be noted that the low-side switch 1025 is an NMOS power transistor. A first terminal of the output inductor 1021 is electrically coupled to the switch output terminal, and a second terminal of the output inductor 1021 is electrically coupled to the voltage output terminal. A first terminal of the filter resistor 1022 is electrically coupled to the first terminal of the output inductor 1021. A first terminal of the filter capacitor 1023 is electrically coupled to a second terminal of the filter resistor 1022, and a second terminal of the filter capacitor 1023 is electrically coupled to the second terminal of the output inductor 1021.

In FIGS. 2 and 4, $R_{si}$ represents the parasitic resistance of the PCB trace from the switch output terminal to the left end of the output inductor 1021 in the ith converter branch; $R_{pi}$ represents the parasitic resistance of the PCB trace from the right end of the output inductor 1021 to the output capacitor Cout in the ith converter branch; $R_{li}$ represents the parasitic DCR resistance of the output inductor 1021 itself in the ith converter branch; $R_{fi}$ can be integrated into the chip to filter the inductor current information, thereby obtaining the synchronous information and DC information of the inductor current; and Lxi represents the switch output terminal in the ith converter branch. Here, $1 \le i = M$, and i is a positive integer.

When the duty cycle signal DUTY is a high logic signal H, the high-side switch 1024 turns on, and the low-side switch 1025 turns off, allowing an input voltage VIN of the power supply terminal to power the output inductor 1021 and the load. When the duty cycle signal DUTY is a low logic signal L, the high-side switch 1024 turns off, and the low-side switch 1025 turns on, allowing the output inductor 1021 and the output capacitor Cout to power the load. Within one period, the longer the duty cycle signal DUTY stays high, the greater the output current of this phase. Conversely, the longer the duty cycle signal DUTY stays low, the smaller the output current of this phase.

Taking the current converter branch as the Nth converter branch as an example, a negative terminal of the current information error amplifier 1011 is connected to the detection voltage Vsen (N) of the Nth converter branch, and a positive terminal of the current information error amplifier 1011 is connected to the detection voltage Vsen (N−1) of the (N−1)th converter branch, outputting the current information error signal Vos(N) of the Nth converter branch. When the output current of the Nth converter branch is greater than that of the (N−1)th converter branch, that is, Vsen (N)>Vsen (N−1), Vcs(N) will decrease, and the modulation voltage signal Vos(N) controlled by the Vcs(N) will also decrease. A positive terminal of the pulse width modulation comparator 1013 is connected to the modulation voltage signal Vos(N) of the Nth converter branch, and a negative terminal of the pulse width modulation comparator 1013 is connected to the synchronous ramp signal RAMP(N) of the Nth converter branch. At this time, RAMP(N) needs to decrease further to be lower than Vos(N) and make the duty cycle modulation set signal of the Nth converter branch high. That is, the decrease of Vos(N) increases the off time of the current switching period of the Nth converter branch, thereby reducing the duty cycle of the Nth converter branch, and the output current of this phase also decreases accordingly. Conversely, when the output current of the Nth converter branch is less than that of the (N−1)th converter branch, that is, Vsen (N)<Vsen (N−1), Vcs(N) will increase, and the Vos(N) it controls will also increase. By connecting the positive terminal of the pulse width modulation comparator 1013 to Vos(N), and the negative terminal of the pulse width modulation comparator 1013 to RAMP(N), the pulse width modulation comparator 1013 will make the duty cycle modulation set signal high, that is, the increase of Vos(N) reduces the off time of the current switching period of the Nth converter branch, thereby increasing the duty cycle of the Nth converter branch, and the output current of this phase also increases accordingly. By monitoring the current error information between adjacent phases in real-time, the modulation voltage signal is generated, thereby controlling the duty cycle to achieve multi-phase current sharing feedback control.

In one embodiment, the synchronous ramp voltage generation circuit 1012 comprises an output voltage sampling circuit (or feedback sampling circuit, FSC) and a synchronous ramp generation circuit (or, SRGC). The output voltage sampling circuit and the synchronous ramp generation circuit comprise a filter circuit and a coupling capacitor. The filter circuit performs cycle-by-cycle filtering of the voltage at the switch output terminal of the power stage output circuit 102. The coupling capacitor is connected to the filter circuit, coupling the output voltage ripple to the synchronous ramp to output a ramp signal that is synchronized with the inductor current in the power stage output circuit 102.

Figure 5:
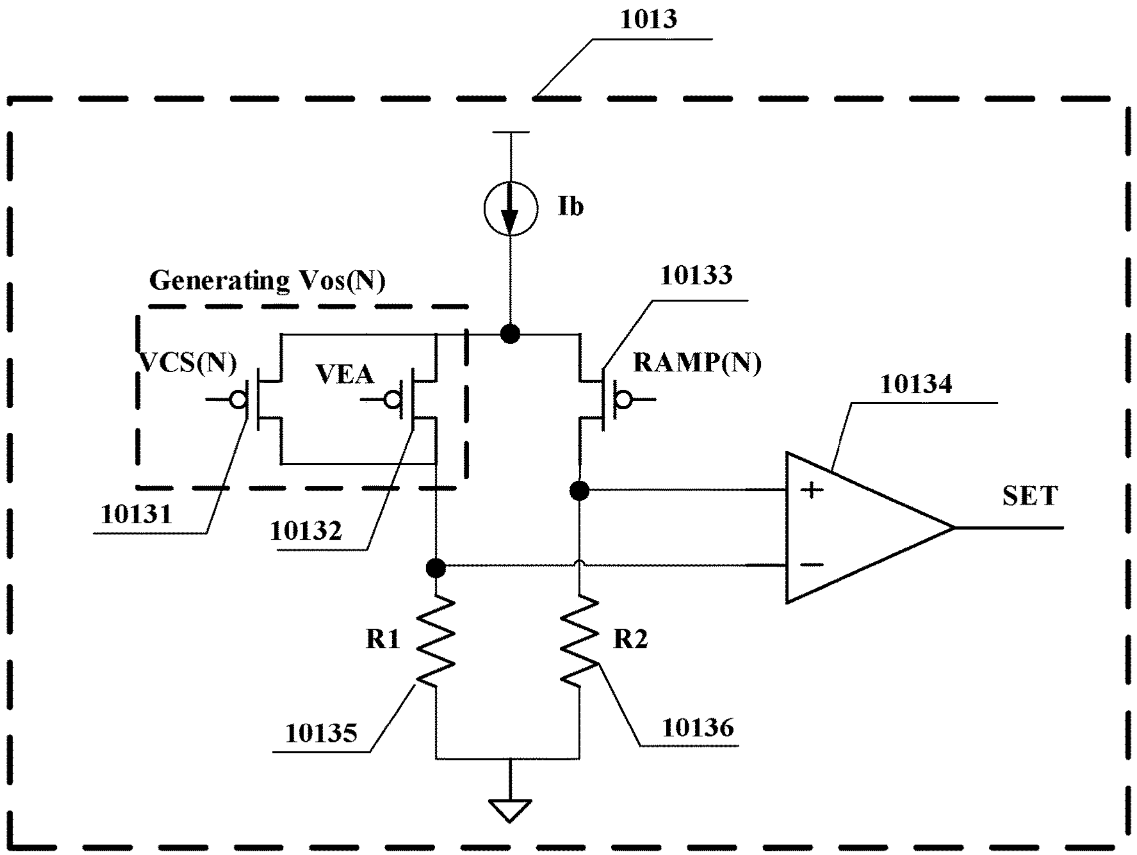
FIG. 5 is a schematic structural diagram of a pulse width modulation comparator according to an embodiment of the present disclosure.

FIG. 5 is a schematic structural diagram of a pulse width modulation comparator according to an embodiment of the present disclosure. In some embodiments, referring to FIG. 5, the pulse width modulation comparator 1013 in one of the converter branches comprises a first PMOS transistor 10131, a second PMOS transistor 10132, a third PMOS transistor 10133, a first comparator 10134, a first resistor 10135, and a second resistor 10136. A gate of the first PMOS transistor 10131 is connected to an output terminal of a corresponding current information error amplifier 1011. A gate of the second PMOS transistor 10132 is connected to an output terminal of the loop error amplifier 103, a source of the second PMOS transistor 10132 is connected to a source of the first PMOS transistor 10131, and a drain of the second PMOS transistor 10132 is connected to a drain of the first PMOS transistor 10131. A gate of the third PMOS transistor 10133 is connected to an output terminal of a corresponding synchronous ramp voltage generation circuit 1012, and a source of the third PMOS transistor 10133 is connected to the source of the second PMOS transistor 10132. An output terminal of the first comparator 10134 outputs the duty cycle modulation set signal. A first terminal of the first resistor 10135 is connected to the drain of the second PMOS transistor and an inverting input terminal of the first comparator 10134, and a second terminal of the first resistor 10135 is grounded. A first terminal of the second resistor 10136 is connected to a drain of the third PMOS transistor 10133 and a non-inverting input terminal of the first comparator 10134, and a second terminal of the second resistor 10136 is grounded.

Taking the current converter branch as the Nth converter branch as an example, the pulse width modulation comparator 1013 shown in FIG. 5 is a three-input comparator, a positive terminal of a first-stage input of the three-input comparator is connected with the output voltage error signal Vea, a negative terminal of the first-stage input of the three-input comparator is connected with the synchronous ramp signal RAMP(N). The first-stage input of the three-input comparator is a PMOS transistor, and the positive terminal of the first-stage input is connected with one PMOS transistor in parallel, and a gate of the parallel PMOS transistor is connected with the current information error signal Vcs(N), so that the output voltage error signal Vea and the current information error signal Vcs(N) are superposed in a transconductance mode, and then the resulting signal is compared with the synchronous ramp signal RAMP(N).

Figure 6:
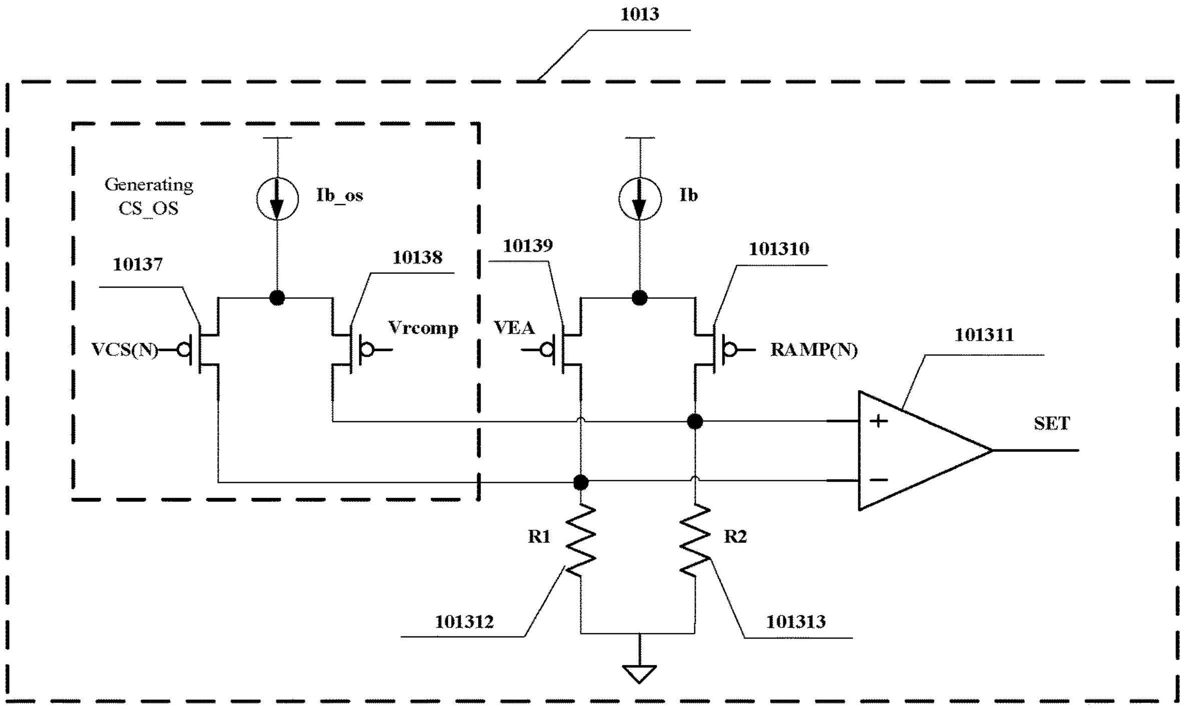
FIG. 6 is a schematic structural diagram of a pulse width modulation comparator according to another embodiment of the present disclosure.

FIG. 6 is a schematic structural diagram of a pulse width modulation comparator according to another embodiment of the present disclosure. In some embodiments, the pulse width modulation comparator 1013 further comprises a common-mode level generation circuit. Referring to FIG. 6, the pulse width modulation comparator 1013 comprises a fourth PMOS transistor 10137, a fifth PMOS transistor 10138, a sixth PMOS transistor 10139, a seventh PMOS transistor 101310, a second comparator 101311, a third resistor 101312, and a fourth resistor 101313. A gate of the fourth PMOS transistor 10137 is connected to an output terminal of a corresponding current information error amplifier 1011. A gate of the fifth PMOS transistor 10138 is connected to an output terminal of the common-mode level generation circuit, a source of the fifth PMOS transistor 10138 is connected to a source of the fourth PMOS transistor 10137, and a drain of the fifth PMOS transistor 10138 is connected to a drain of the fourth PMOS transistor 10137. A gate of the sixth PMOS transistor 10139 is connected to an output terminal of the loop error amplifier 103. A gate of the seventh PMOS transistor 101310 is connected to an output terminal of a corresponding synchronous ramp voltage generation circuit 1012, and a source of the seventh PMOS transistor 101310 is connected to a source of the sixth PMOS transistor 10139. An output terminal of the second comparator 101311 outputs the duty cycle modulation set signal. A first terminal of the third resistor 101312 is connected to the drain of the fourth PMOS transistor 10137 and a drain of the sixth PMOS transistor 10139, and a second terminal of the third resistor 101312 is grounded. A first terminal of the fourth resistor 101313 is connected to the drain of the fifth PMOS transistor 10138 and a drain of the seventh PMOS transistor 101310, and a second terminal of the fourth resistor 101313 is grounded.

Similarly, taking the current converter branch as the Nth converter branch as an example, the pulse width modulation comparator 1013 shown in FIG. 6 is a four-input comparator, a first positive terminal of a first-stage input of the four-input comparator is connected with the output voltage error signal Vea, a first negative terminal of the first-stage input of the four-input comparator is connected with the synchronous ramp signal RAMP(N). A second positive terminal of the four-input comparator is connected with common-mode level output by an output terminal of the common-mode level generation circuit, and a second negative terminal of the four-input comparator is connected with the current information error signal Vcs(N). The structure of the PMOS pairs superimposes the output voltage error signal Vea and the current information error signal Vcs(N) in a transconductance manner, and then the resulting signal is compared with the synchronous ramp signal RAMP(N).

Figure 7:
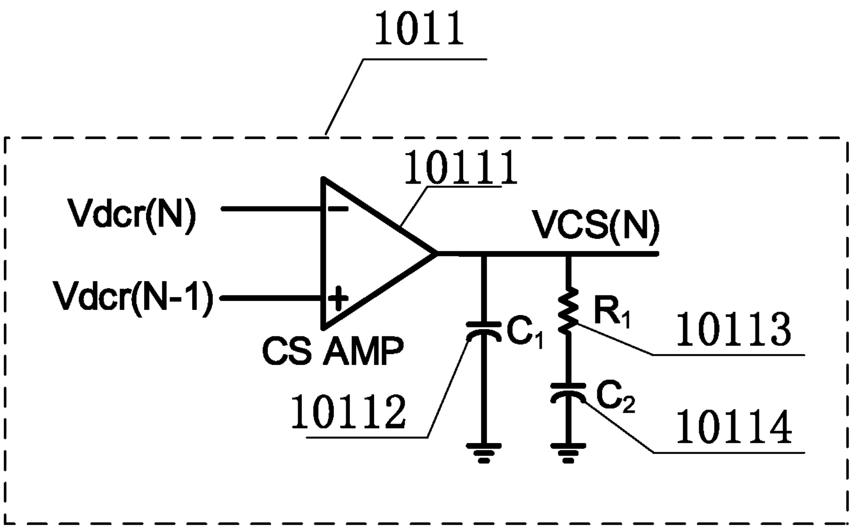
FIG. 7 is a schematic structural diagram of a current information error amplifier according to an embodiment of the present disclosure.

FIG. 7 is a schematic structural diagram of a current information error amplifier according to an embodiment of the present disclosure. In some embodiments, referring to FIG. 7, the current information error amplifier 1011 comprises a current information detection amplifier 10111, a first capacitor 10112, a fifth resistor 10113, and a second capacitor 10114. A non-inverting input terminal of the current information detection amplifier 10111 inputs the detection voltage across the output inductor in the previous converter branch, and an inverting input terminal of the current information detection amplifier 10111 inputs the detection voltage across the output inductor in the current converter branch. A first terminal of the first capacitor 10112 is connected to an output terminal of the current information detection amplifier 10111, and a second terminal of the first capacitor 10112 is grounded. A first terminal of the fifth resistor 10113 is connected to the first terminal of the first capacitor 10112 and the output terminal of the current information detection amplifier 10111. A first terminal of the second capacitor 10114 is connected to a second terminal of the fifth resistor 10113, and a second terminal of the second capacitor 10114 is grounded.

FIG. 7 illustrates the current error information detection stage between two adjacent phases. The current information error amplifier 1011 comprises the current information detection amplifier 10111 and a compensation network (C1/R1/C2, also known as a resistor-capacitor network) for the current-sharing loop. This compensation network consists of the first capacitor 10112, the fifth resistor 10113, and the second capacitor 10114. Taking the current converter branch as the Nth converter branch as an example, the current information error amplifier 1011 compares the detection voltage Vsen (N) and the detection voltage Vsen (N−1) and generates the current information error signal Vcs(N). The current information error signal Vcs(N) is then output to the connected RC network, which provides the necessary zero compensation for the current-sharing loop, ensuring the stability of the current-sharing loop.

Optionally, switching frequencies of the converter branches are the same, and a phase shift of a $P_{th}$ converter branch is $$\frac{(P-1)\times 360}{M},$$

where 1≤p≤m, and p is positive integer.

The switching frequency and phase shift of each converter branch are shown in Table 1 below:

TABLE 1

| | Phase shift | Switching frequency |
|---|---|---|
| First phase BUCK | 0 | Fref1 = Fsw |
| Second phase BUCK | 1*360/M | Fref2 = Fsw |
| Third phase BUCK | 2*360/M | Fref3 = Fsw |
| . . . | . . . | . . . |
| Mth phase BUCK | (N − 1)*360/M | Fref(M) = Fsw |

Where Fsw represents the switching frequency of each phase. By setting the switching frequency of each phase in the multi-phase buck converter to be the same and implementing uniform phase shift control, the output load ripple can be reduced, making the output equivalent to a switching frequency of M*Fsw. The phase-shifted frequency locking control for M phases ensures that the switching frequencies between the M phases remain uniformly phase-shifted, achieving a high-frequency equivalent effect for output voltage control and optimizing system design.

When the multi-phase buck converter is configured as a four-phase buck converter, simulations and actual measurements have verified that under the conditions of an input VIN=5 V, output VOUT=1 V, and load IOUT=16 A, the four-phase buck converter consistently maintains the fast transient response characteristic of the ACOT architecture while achieving stable multi-phase current sharing control.

The present disclosure further provides a chip. The chip comprises a die, on which a multi-phase buck converter as described in the above embodiments is arranged. In the multi-phase buck converter, an input terminal of one of the power stage output circuits is electrically coupled to an output terminal of a corresponding driving module through a first trace on the die, an output terminal of the power stage output circuit is electrically coupled to the voltage output terminal through a second trace on the die, and the voltage output terminal is configured to be electrically coupled to a load.

The terms "first," "second," "third," "fourth," "fifth," "sixth," and "seventh" in the present disclosure merely indicate the order of description and do not have any other substantive meaning. Additionally, in FIGS. 1-7, the reference numerals of the circuit elements in each phase are labeled according to their respective phases. For example, the output inductor of the first phase is labeled as L1. Other circuit elements are similarly labeled and will not be redundantly described here.

In summary, the current information error signal from the current information error amplifier and the output voltage error signal from the loop error amplifier are combined by the pulse width modulation comparator to create the modulation voltage signal. The modulation voltage signal is then compared with the synchronous ramp signal generated by the synchronous ramp voltage generation circuit to produce the duty cycle modulation set signal. The driving control circuit uses the duty cycle modulation set signal to generate the driving signal, which causes the power stage output circuit in the current converter branch to output the output voltage. Additionally, the duty cycle modulation set signal can control the duty cycle of the current converter branch, achieving multi-phase current sharing control. The design of the multi-phase buck converter is straightforward and cost-effective. Therefore, the present disclosure effectively overcomes various shortcomings of the prior art and has a high industrial value.

The above-mentioned embodiments are merely illustrative of the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the present disclosure.

The invention claimed is:

1. A multi-phase buck converter, comprising:

M converter branches connected in parallel, each of the M converter branches comprising a driving module and a power stage output circuit electrically coupled between the driving module and a voltage output terminal, wherein M is an integer greater than 2; and a loop error amplifier, configured to compare an output voltage at the voltage output terminal with a reference voltage to generate an output voltage error signal, wherein the driving module in one of the M converter branches, other than a first converter branch, from a second to an Mth converter branch comprises:

a current information error amplifier, configured to receive, as a first terminal input, a detection voltage across an output inductor of the power stage output circuit in the one of the M converter branches, configured to receive, as a second terminal input, a detection voltage across an output inductor of the power stage output circuit in a previous converter branch, and configured to compare the first terminal input with the second terminal input to generate a current information error signal;

a synchronous ramp voltage generation circuit, configured to generate a synchronous ramp signal based on the output voltage at the voltage output terminal;

a pulse width modulation comparator, configured to superimpose the current information error signal to the output voltage error signal to generate a modulation voltage signal, and compare the modulation voltage signal with the synchronous ramp signal to generate a duty cycle modulation set signal; and a driving control circuit, configured to generate a driving signal based on the duty cycle modulation set signal, such that the power stage output circuit in the one of the M converter branches outputs the output voltage based on the driving signal;

wherein the driving control circuit in the one of the M converter branches comprises:

an RS flip-flop, configured to generate a duty cycle signal based on the duty cycle modulation set signal; and a switch driving circuit, configured to generate the driving signal based on the duty cycle signal;

wherein the driving module in the one of the M converter branches further comprises:

an adaptive constant-on-time generation circuit, configured to generate a duty cycle reset signal based on the duty cycle signal and a reference switching frequency of the one of the M converter branches, wherein the RS flip-flop is configured to generate the duty cycle signal based on the duty cycle modulation set signal and the duty cycle reset signal;

wherein the adaptive constant-on-time generation circuit is configured to:

generate a frequency error signal based on the duty cycle signal and the reference switching frequency:

generate an adaptive on-capacitance voltage signal based on the duty cycle signal; and generate the duty cycle reset signal based on the frequency error signal and the adaptive on-capacitance voltage signal;

wherein the synchronous ramp voltage generation circuit in the one of the M converter branches is configured to:

generate the synchronous ramp signal based on the output voltage and a voltage at a switch output terminal of the power stage output circuit in the one of the M converter branches, wherein the output inductor is electrically coupled between the switch output terminal and the voltage output terminal.

2. The multi-phase buck converter of claim 1, wherein the power stage output circuit in the one of the M converter branches comprises the output inductor and an RC circuit electrically coupled in parallel with the output inductor, and the RC circuit comprises a filter resistor and a filter capacitor which are electrically coupled in series, wherein the filter resistor and the filter capacitor are configured to filter a voltage across the output inductor to obtain the detection voltage corresponding to a current flowing through the output inductor.

3. The multi-phase buck converter of claim 1, wherein the driving module in the first converter branch of the M converter branches comprises:

a synchronous ramp voltage generation circuit, configured to generate a synchronous ramp signal based on the output voltage at the voltage output terminal;

a pulse width modulation comparator, configured to compare the output voltage error signal with the synchronous ramp signal to generate a duty cycle modulation set signal; and a driving control circuit, configured to generate a driving signal based on the duty cycle modulation set signal, such that the power stage output circuit in the first converter branch of the M converter branches outputs the output voltage based on the driving signal.

4. The multi-phase buck converter of claim 1, wherein the driving module in the first converter branch of the M converter branches comprises:

a current information error amplifier, configured to receive, as a first terminal input, a detection voltage across an output inductor of the power stage output circuit in the first converter branch of the M converter branches, to receive, as a second terminal input, a detection voltage across an output inductor of the power stage output circuit in the Mth converter branch, and to compare the first terminal input with the second terminal input to generate a current information error signal;

a synchronous ramp voltage generation circuit, configured to generate a synchronous ramp signal based on the output voltage at the voltage output terminal;

a pulse width modulation comparator, configured to superimpose the current information error signal to the output voltage error signal to generate a modulation voltage signal, and compare the modulation voltage signal with the synchronous ramp signal to generate a duty cycle modulation set signal; and a driving control circuit, configured to generate a driving signal based on the duty cycle modulation set signal, such that the power stage output circuit in the first converter branch of the M converter branches outputs the output voltage based on the driving signal.

5. The multi-phase buck converter of claim 1, wherein the power stage output circuit in the one of the M converter branches comprises a high-side switch, a low-side switch, the output inductor, a filter resistor, and a filter capacitor, wherein a source of the high-side switch is electrically coupled to a power supply terminal, a drain of the high-side switch is electrically coupled to a switch output terminal, and a gate of the high-side switch receives the driving signal, wherein a source of the low-side switch is grounded, a drain of the low-side switch is electrically coupled to the switch output terminal, and a gate of the low-side switch receives the driving signal, wherein a first terminal of the output inductor is electrically coupled to the switch output terminal, and a second terminal of the output inductor is electrically coupled to the voltage output terminal, and wherein a first terminal of the filter resistor is electrically coupled to the first terminal of the output inductor, a first terminal of the filter capacitor is electrically coupled to a second terminal of the filter resistor, and a second terminal of the filter capacitor is electrically coupled to the second terminal of the output inductor.

6. The multi-phase buck converter of claim 1, wherein the pulse width modulation comparator in the one of the M converter branches comprises:

a first PMOS transistor, wherein a gate of the first PMOS transistor is connected to an output terminal of a corresponding current information error amplifier;

a second PMOS transistor, wherein a gate of the second PMOS transistor is connected to an output terminal of the loop error amplifier, a source of the second PMOS transistor is connected to a source of the first PMOS transistor, and a drain of the second PMOS transistor is connected to a drain of the first PMOS transistor;

a third PMOS transistor, wherein a gate of the third PMOS transistor is connected to an output terminal of a corresponding synchronous ramp voltage generation circuit, and a source of the third PMOS transistor is connected to the source of the second PMOS transistor;

a first comparator, wherein an output terminal of the first comparator outputs the duty cycle modulation set signal;

a first resistor, wherein a first terminal of the first resistor is connected to the drain of the second PMOS transistor and an inverting input terminal of the first comparator, and a second terminal of the first resistor is grounded; and a second resistor, wherein a first terminal of the second resistor is connected to a drain of the third PMOS transistor and a non-inverting input terminal of the first comparator, and a second terminal of the second resistor is grounded.

7. The multi-phase buck converter of claim 1, further comprising a common-mode level generation circuit, wherein the pulse width modulation comparator in the one of the M converter branches comprises:

a fourth PMOS transistor, wherein a gate of the fourth PMOS transistor is connected to an output terminal of the corresponding current information error amplifier;

a fifth PMOS transistor, wherein a gate of the fifth PMOS transistor is connected to an output terminal of the common-mode level generation circuit, a source of the fifth PMOS transistor is connected to a source of the fourth PMOS transistor (NOT SHOWN);

a sixth PMOS transistor, wherein a gate of the sixth PMOS transistor is connected to an output terminal of the loop error amplifier;

a seventh PMOS transistor, wherein a gate of the seventh PMOS transistor is connected to an output terminal of the corresponding synchronous ramp voltage generation circuit, and a source of the seventh PMOS transistor is connected to a source of the sixth PMOS transistor;

a second comparator, wherein an output terminal of the second comparator outputs the duty cycle modulation set signal;

a third resistor, wherein a first terminal of the third resistor is connected to a drain of the fourth PMOS transistor and a drain of the sixth PMOS transistor, and a second terminal of the third resistor is grounded; and a fourth resistor, wherein a first terminal of the fourth resistor is connected to a drain of the fifth PMOS transistor and a drain of the seventh PMOS transistor, and a second terminal of the fourth resistor is grounded.

8. The multi-phase buck converter of claim 1, wherein the current information error amplifier in the one of the M converter branches comprises:

a current information detection amplifier, wherein a non-inverting input terminal of the current information detection amplifier inputs the detection voltage across the output inductor in the previous converter branch, and an inverting input terminal of the current information detection amplifier inputs the detection voltage across the output inductor in the one of the M converter branches;

a first capacitor, wherein a first terminal of the first capacitor is connected to an output terminal of the current information detection amplifier, and a second terminal of the first capacitor is grounded;

a fifth resistor, wherein a first terminal of the fifth resistor is connected to the first terminal of the first capacitor and the output terminal of the current information detection amplifier; and a second capacitor, wherein a first terminal of the second capacitor is connected to a second terminal of the fifth resistor, and a second terminal of the second capacitor is grounded.

9. The multi-phase buck converter of claim 1, wherein switching frequencies of the M converter branches are the same, and a phase shift of a $P_{th}$ converter branch is $$\frac{(P-1)\times 360}{M},$$

where 1≤p≤m and p is a positive integer.

10. The multi-phase buck converter of claim 1, wherein the output inductors in the M converter branches are configured to have same parameters and same parasitic resistances.

11. A chip, comprising:

a die, on which a multi-phase buck converter is provided, wherein the multi-phase buck converter comprises:

M converter branches connected in parallel, each of the M converter branches comprising a driving module and a power stage output circuit electrically coupled between the driving module and a voltage output terminal, wherein M is an integer greater than 2; and a loop error amplifier, configured to compare an output voltage at the voltage output terminal with a reference voltage to generate an output voltage error signal, wherein the driving module in one of the M converter branches, other than a first converter branch, from a second to an Mth converter branch comprises:

a current information error amplifier, configured to receive, as a first terminal input, a detection voltage across an output inductor of the power stage output circuit in the one of the M converter branches, to receive, as a second terminal input, a detection voltage across an output inductor of the power stage output circuit in a previous converter branch, and to compare the first terminal input with the second terminal input to generate a current information error signal;

a synchronous ramp voltage generation circuit, configured to generate a synchronous ramp signal based on the output voltage at the voltage output terminal;

a pulse width modulation comparator, configured to superimpose the current information error signal to the output voltage error signal to generate a modulation voltage signal, and compare the modulation voltage signal with the synchronous ramp signal to generate a duty cycle modulation set signal; and a driving control circuit, configured to generate a driving signal based on the duty cycle modulation set signal, such that the power stage output circuit in the one of the M converter branches outputs the output voltage based on the driving signal, wherein an input terminal of one of the power stage output circuits is electrically coupled to an output terminal of a corresponding driving module through a first trace on the die, an output terminal of the power stage output circuit is electrically coupled to the voltage output terminal through a second trace on the die, and the voltage output terminal is configured to be electrically coupled to a load;

wherein the driving control circuit in the one of the M converter branches comprises:

an RS flip-flop, configured to generate a duty cycle signal based on the duty cycle modulation set signal; and a switch driving circuit, configured to generate the driving signal based on the duty cycle signal;

wherein the driving module in the one of the M converter branches further comprises:

an adaptive constant-on-time generation circuit, configured to generate a duty cycle reset signal based on the duty cycle signal and a reference switching frequency of the one of the M converter branches, wherein the RS flip-flop is configured to generate the duty cycle signal based on the duty cycle modulation set signal and the duty cycle reset signal;

wherein the adaptive constant-on-time generation circuit is configured to:

generate a frequency error signal based on the duty cycle signal and the reference switching frequency:

generate an adaptive on-capacitance voltage signal based on the duty cycle signal; and generate the duty cycle reset signal based on the frequency error signal and the adaptive on-capacitance voltage signal;

wherein the synchronous ramp voltage generation circuit in the one of the M converter branches is configured to:

generate the synchronous ramp signal based on the output voltage and a voltage at a switch output terminal of the power stage output circuit in the one of the M converter branches, wherein the output inductor is electrically coupled between the switch output terminal and the voltage output terminal.

12. The chip of claim 11, wherein the driving module in the first converter branch of the M converter branches comprises:

a synchronous ramp voltage generation circuit, configured to generate a synchronous ramp signal based on the output voltage at the voltage output terminal;

a pulse width modulation comparator, configured to compare the output voltage error signal with the synchronous ramp signal to generate a duty cycle modulation set signal; and a driving control circuit, configured to generate a driving signal based on the duty cycle modulation set signal, such that the power stage output circuit in the first converter branch of the M converter branches outputs the output voltage based on the driving signal.

13. The chip of claim 11, wherein the driving module in the first converter branch of the M converter branches comprises:

a current information error amplifier, configured to receive, as a first terminal input, a detection voltage across an output inductor of the power stage output circuit in the first converter branch of the M converter branches, to receive, as a second terminal input, a detection voltage across an output inductor of the power stage output circuit in the Mth converter branch, and to compare the first terminal input with the second terminal input to generate a current information error signal;

a synchronous ramp voltage generation circuit, configured to generate a synchronous ramp signal based on the output voltage at the voltage output terminal;

a pulse width modulation comparator, configured to superimpose the current information error signal to the output voltage error signal to generate a modulation voltage signal, and compare the modulation voltage signal with the synchronous ramp signal to generate a duty cycle modulation set signal; and a driving control circuit, configured to generate a driving signal based on the duty cycle modulation set signal, such that the power stage output circuit in the first converter branch of the M converter branches outputs the output voltage based on the driving signal.

14. The chip of claim 11, wherein the power stage output circuit in the one of the M converter branches comprises the output inductor and an RC circuit electrically coupled in parallel with the output inductor, and the RC circuit comprises a filter resistor and a filter capacitor which are electrically coupled in series, wherein the filter resistor and the filter capacitor are configured to filter a voltage across the output inductor to obtain the detection voltage corresponding to a current flowing through the output inductor.

* * * * *